Patented Nov. 15, 1932

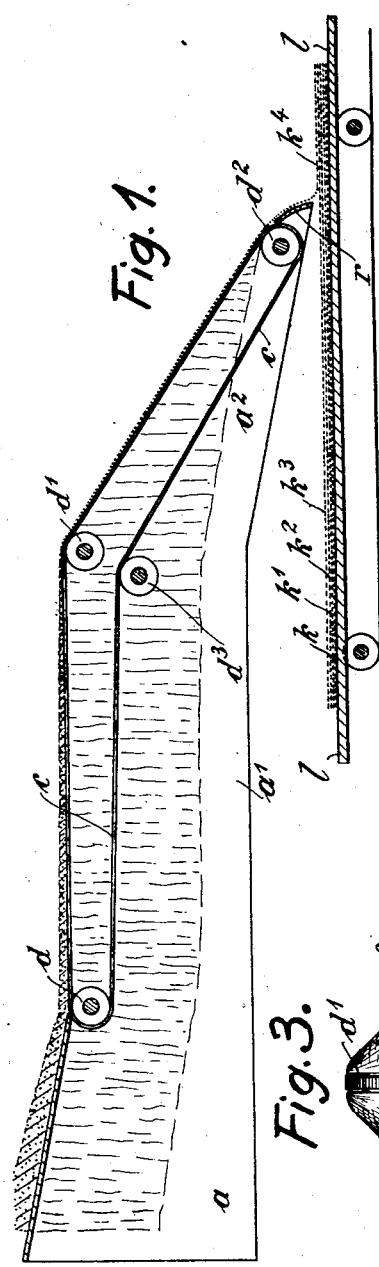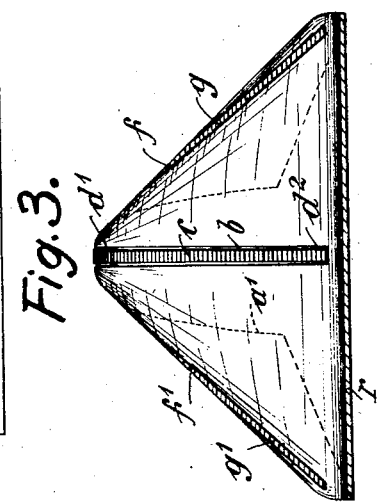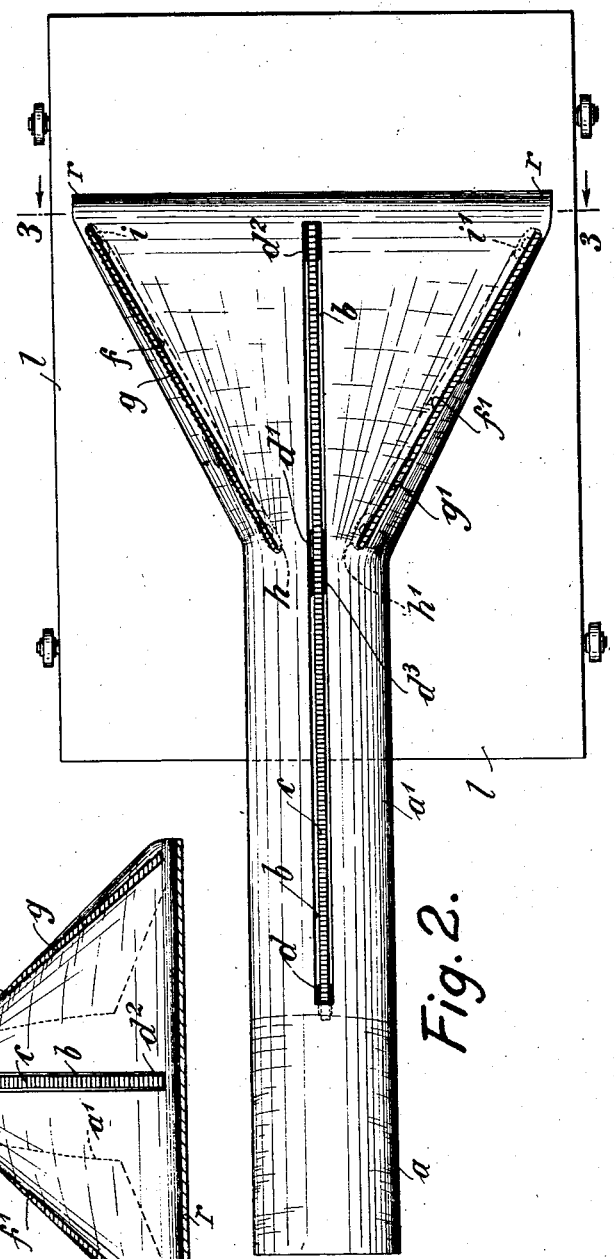

1,887,673

UNITED STATES PATENT OFFICE

ALBERT BORCHOLT AND OTTO MEYER, OF BERGEDORF, NEAR HAMBURG, GERMANY, ASSIGNORS TO FIRM: OSCAR GOSSLER, OF HAMBURG, GERMANY

ARRANGEMENT FOR TEASING AND LAYERING SPUN GLASS

Application filed October 28, 1931, Serial No. 571,614, and in Germany May 12, 1931.

The invention relates to an arrangement for teasing and layering spun glass for the purpose of producing loose packings for heat insulation purposes or the like.

In the manufacture of spun glass the thin fibres are wound densely on a rapidly rotating drum. In order that the spun glass which is frequently used as heat insulating material should have a high heat insulating capacity, it must be regularly layered and used in the loosened state for the manufacture of heat insulating bodies. For this reason the glass fibres after being taken from the drum must be loosened i. e., teased or separated, and subsequently layered.

This teasing and layering of the spun glass has for some considerable time been effected manually which is a tedious and expensive operation.

The object of the present invention is to effect the teasing and layering mechanically. In order to effect this, according to the invention the spun glass which is taken in hanks from the spinning drum is hung over a trestle-like frame in such manner that it hangs down on either side of the frame as equally as possible. By means of a conveyor of any suitable kind, disposed preferably in the centre of the frame, the teasing of the hanks and the separation of the glass fibres is now effected. In this operation the hanks hanging downwardly in the form of an inverted U are gradually raised into one plane so that finally a layer of one or more strata of spun glass fibres is obtained which ultimately due to progressive motion along the frame is deposited on a bed preferably automatically. In order to allow the glass fibres in the layer to pass to the bed in the extended condition and in order to lift the ends of the spun glass fibres hanging down on either side of the frame, the apparatus is of corresponding configuration in that the outer surface of the frame, which is curved in the form of a horse-shoe or constructed in the shape of a gable, gradually merges into a plane surface. During this operation provision must be made for moving the ends of the glass fibres as quickly as the central portions and this is effected by further conveyor arrangements which are disposed in the frame laterally of the forward end of the central conveyor. These conveyor arrangements operate on the spun glass fibres in such manner that when they arrive at the plane end of the frame they are in an extended position and pass in this plane extended state to the bed.

One embodiment of the arrangement according to the invention is shown by way of example in the drawing:

Fig. 1 is a central longitudinal section through an arrangement according to the invention.

Fig. 2 is a plan view of the arrangement shown in Fig. 1.

Fig. 3 is a section along the line 3—3 of Fig. 2.

The frame is indicated by $a$, $a'$ and $a^2$; the rear part $a$ of the frame is inclined downwardly, the adjacent central part $a'$ is disposed horizontally and the foremost part $a^2$ has a ramp-like construction.

Whereas the rear portion $a$ and the central portion $a'$ of the frame are of horse-shoe or gable shape in cross-section, the front part $a^2$ of the frame is shaped so as gradually to broaden towards the front. A slot $b$ is provided along the crest of the portions $a'$ and $a^2$ of the frame. This slot $b$ serves to receive the upper span of an endless band $c$ which passes over the discs $d$, $d'$, $d^2$ and $d^3$ and projects slightly above the slot $b$ in the frame $a$, $a'$ $a^2$.

In addition slots $f$, $f'$ are provided in the portion $a^2$ of the frame to receive conveyor bands $g$, $g'$. These conveyor bands pass over rollers $h$, $i$ and $h'$, $i'$. The transport bands $c$, $g$ and $g'$ are driven in any suitable manner and in such way that in each case the upper spans move forwardly from the rear.

The spun glass, which is taken in the form of hanks from the winding drum, is placed on the rear part $a$ of the frame in such manner that it hangs equally on either side in the manner indicated in Fig. 1.

The glass hanks hanging downwardly from the gable-shaped portion $a$ of the frame are engaged by the conveyor $c$ and teased or drawn apart into individual fibres or strands, the glass hanks preferably being beaten or lifted or agitated by means of flaps or the like, not shown in the drawing, provided laterally on the portion $a'$ of the frame.

Thus glass strands becoming progressively thinner and finer as they proceed towards $d'$ are teased out from the compact glass hanks.

While the glass hanks are hanging on the gable-shaped part $a'$ somewhat in the shape of an inverted U, they are gradually spread out on the oblique guiding surface of the section $a^2$ of the frame so that the downwardly hanging strands are gradually lifted and when approximately in the vicinity of the roller $d^2$ are disposed completely in a straight line so that a completely level layer of spun glass is fed to the bed $l$ by the roller $d^2$.

In this layer of spun glass the individual fibres which initially are loosened by the endless band $c$, and are further teased or separated by combined action of the conveyors $c$, $g$ and $g'$ are finally disposed adjacent each other or superimposed so as to obtain spun glass layer or stratum of uniform thickness which then passes to the bed.

In the drawing this bed is indicated by $l$. It is shown by way of example as a carriage which can be moved to and fro beneath the forward end $r$ of the teasing or separating frame.

In Fig. 1, four layers of spun glass $k$, $k'$, $k^2$, $k^3$ are shown already deposited on the bed $l$, while a fifth layer of spun glass $k^4$ is in the process of being deposited. During this operation the bed $l$ is moved forwardly i. e., to the right in Figs. 1 and 2.

We claim:—

1. Apparatus for teasing and layering spun glass comprising a trestle-like frame, a ramp-shaped forward end to said frame and at least one conveyor associated with said frame for conveying the spun glass towards said forward end.

2. Apparatus for teasing and layering spun glass comprising a trestle-like frame, a ramp-shaped forward end to said frame, a central conveyor extending longitudinally of said frame to convey the spun glass towards said forward end and auxiliary lateral conveyors associated with said ramp for assisting the conveyance of the spun glass thereover.

3. Apparatus for teasing and layering spun glass comprising a trestle-like frame, a ramp-shaped forward end to said frame, at least one conveyer associated with said frame for conveying the spun glass towards said forward end, and means disposed beneath said forward end to receive the spun glass therefrom.

4. Apparatus for teasing and layering spun glass comprising a trestle-like frame, a ramp-shaped forward end to said frame, a central conveyor extending longitudinally of said frame to convey the spun glass towards said forward end, auxiliary lateral conveyors associated with said ramp for assisting the conveyance of the spun glass thereover, and means disposed beneath said forward end to receive the spun glass therefrom.

5. Apparatus for teasing and layering spun glass comprising a trestle-like frame, a ramp-shaped forward end to said frame, at least one conveyor associated with said frame for conveying the spun glass towards said forward end, and means disposed beneath said forward end to receive the spun glass therefrom, and adapted to be advanced in the direction of conveyance of the conveyor during the deposition of spun glass thereon.

6. Apparatus for teasing and layering spun glass comprising a trestle-like frame, a ramp-shaped forward end to said frame, a central conveyor extending longitudinally of said frame to convey the spun glass towards said forward end, auxiliary lateral conveyors associated with said ramp for assisting the conveyance of the spun glass thereover, and means disposed beneath said forward end to receive the spun glass therefrom and adapted to be advanced in the direction of conveyance of the conveyor during the deposition of spun glass thereon.

In testimony whereof we have affixed our signatures.

ALBERT BORCHOLT.
OTTO MEYER.